US008933796B2

(12) United States Patent
Kumabe et al.

(10) Patent No.: US 8,933,796 B2
(45) Date of Patent: Jan. 13, 2015

(54) OBSTACLE NOTIFICATION APPARATUS

(75) Inventors: Seigou Kumabe, Okazaki (JP); Toshiyuki Ito, Anjo (JP)

(73) Assignee: Denso Corporation, Kariya (JP)

( * ) Notice: Subject to any disclaimer, the term of this patent is extended or adjusted under 35 U.S.C. 154(b) by 345 days.

(21) Appl. No.: 13/347,831

(22) Filed: Jan. 11, 2012

(65) Prior Publication Data

US 2012/0182140 A1 Jul. 19, 2012

(30) Foreign Application Priority Data

Jan. 14, 2011 (JP) ................................ 2011-006097

(51) Int. Cl.

| | |
|---|---|
| ***B60Q 1/00*** | (2006.01) |
| *G08G 1/16* | (2006.01) |
| *G06K 9/00* | (2006.01) |
| *G06F 17/10* | (2006.01) |
| *G05D 1/00* | (2006.01) |
| *G05D 1/02* | (2006.01) |
| *H04N 7/18* | (2006.01) |

(52) U.S. Cl.

CPC ..................................... *G08G 1/161* (2013.01)
USPC ........ 340/435; 340/425.5; 340/903; 340/436; 382/103; 701/301; 701/1; 701/300; 348/148

(58) Field of Classification Search

CPC ........ B60R 21/00; B60R 11/04; B60R 11/02; B60R 1/00; G08G 1/09; G08G 1/16
USPC ............................ 340/435; 382/103; 701/301
See application file for complete search history.

(56) References Cited

U.S. PATENT DOCUMENTS

| | | | | |
|---|---|---|---|---|
| 2005/0225636 | A1* | 10/2005 | Maemura et al. | 348/148 |
| 2006/0244635 | A1* | 11/2006 | Chavarria | 340/944 |
| 2009/0121852 | A1* | 5/2009 | Breuer et al. | 340/436 |
| 2010/0030474 | A1* | 2/2010 | Sawada | 701/301 |

FOREIGN PATENT DOCUMENTS

| | | |
|---|---|---|
| JP | 2004-326579 | 11/2004 |
| JP | 2005-125953 | 5/2005 |
| JP | 2005-309660 | 11/2005 |
| JP | 2008-176648 | 7/2008 |
| JP | 2008-262458 | 10/2008 |
| JP | 2008-269580 | 11/2008 |

(Continued)

OTHER PUBLICATIONS

Office action dated Jan. 29, 2013 in corresponding Japanese Application No. 2011-006097.

(Continued)

*Primary Examiner* — Jack K Wang

(74) *Attorney, Agent, or Firm* — Harness, Dickey & Pierce, PLC

(57) ABSTRACT

An obstacle notification apparatus uses a sight determination unit for determining a visible area of a driver in a subject vehicle based on whether another vehicle is present around the subject vehicle and a vehicle height of the subject vehicle. After determining whether an obstacle is within the sight of the driver or not, a notification mode is selected to alert the driver of the presence of an obstacle, thereby enabling nuisance-free notification of the obstacle from the obstacle notification apparatus.

8 Claims, 11 Drawing Sheets

(56) References Cited

FOREIGN PATENT DOCUMENTS

| | | |
|---|---|---|
| JP | 2009-026200 | 2/2009 |
| JP | 2012-014616 | 1/2012 |

OTHER PUBLICATIONS

Office action dated Apr. 23, 2013 in corresponding Japanese Application No. 2011-006097.

* cited by examiner

OBSTACLE NOTIFICATION APPARATUS

CROSS REFERENCE TO RELATED APPLICATION

The present application is based on and claims the benefit of priority of Japanese Patent Application No. 2011-6097, filed on Jan. 14, 2011, the disclosure of which is incorporated herein by reference.

TECHNICAL FIELD

The present disclosure generally relates to an obstacle notification apparatus that notifies the presence of an obstacle on and/or around a crosswalk to a driver of a vehicle.

BACKGROUND

Conventionally, a device for the detection and notification of a pedestrian at an intersection is disclosed in Japanese patent publication 2008-176648 (JP '648). In JP '648, a roadside device detects a pedestrian on and/or around the crosswalk. When a pedestrian is detected, the roadside device provides information regarding the detected pedestrian to a vehicle that is turning onto the street that includes the crosswalk where the detected pedestrian is located. An in-vehicle device disposed in the vehicle notifies a driver of the vehicle through sound or image of the detected pedestrian. In such manner, the driver is alerted of a pedestrian who is going to walk across the street on and/or around the crosswalk.

The in-vehicle device disclosed in JP '648 notifies the driver of the pedestrian based on the information received from the roadside device in the same notification mode, regardless of a pedestrian condition. That is, whenever a pedestrian is detected, without regard to whether the pedestrian is in-sight of the driver or not, the driver is notified of the detected pedestrian. Notifying the driver of every one of pedestrians, including already-noticed pedestrians in the sight of the driver, may be a nuisance for the driver, especially when such notification is provided in a high attention calling manner. For example, at an intersection of multi-lane traffic, the crosswalk is filled with pedestrians. In such a situation, the driver in a turning vehicle may feel unnecessarily warned and/or stressed, if he/she is notified of all the pedestrians on and around the crosswalk in a high-attention calling manner.

SUMMARY

In an aspect of the present disclosure, an obstacle notification apparatus for notifying a driver of a subject vehicle at an intersection having a crosswalk of an obstacle may include a notification unit, an obstacle information acquisition unit, a sight determination unit, and a notification mode determination unit.

The notification unit is configured to at least provide a sound to alert the driver of the obstacle. The obstacle information acquisition unit is configured to acquire information regarding the obstacle, which includes the position of the obstacle relative to the crosswalk. The sight determination unit is configured to define a visible area of the driver. The notification mode determination unit is configured to determine a notification mode that is to be performed by the notification unit. The notification mode determination unit may determine the notification mode based on the information acquired by the obstacle information acquisition unit and the visible area of the driver determined by the sight determination unit. In such obstacle notification scheme, the driver may not be unduly notified of an obstacle by the obstacle notification apparatus.

The notification mode determination unit may further consider the position of the subject vehicle when determining the notification mode. The obstacle notification apparatus notifies the driver of the obstacle when the subject vehicle is located at a specific position. That is, when the position of the subject vehicle is determined to be outside of a road width of an intersection entering road, and when the position of the subject vehicle is determined to be before (i.e., in front of) the crosswalk, the notification mode determination unit determines the notification mode of the notification unit.

Accordingly, the notification mode is determined when the position of the subject vehicle is close to the crosswalk, but when the subject vehicle is still before (i.e., in front of) the crosswalk. That is, when the subject vehicle is located at such position, the driver is usually paying attention to the walker and other obstacles on and around the crosswalk, thereby also paying extra attention to the notification from the notification unit. Under such circumstances, if all obstacles are evenly notified in the same mode, obstacle notification may be a nuisance for the driver. Therefore, by adopting the above-described notification scheme, a nuisance for the driver is effectively prevented.

BRIEF DESCRIPTION OF THE DRAWINGS

Objects, features, and advantages of the present disclosure will become more apparent from the following detailed description made with reference to the accompanying drawings, in which.

DETAILED DESCRIPTION

With reference to the drawings, the present disclosure regarding an obstacle notification apparatus is explained in the following. The following description describes a situation where a subject vehicle CS stops in front of a crosswalk Z in a course of turning at an intersection. In such a situation, an obstacle notification system 1 provides a notification to a driver D of the subject vehicle CS about the presence of an obstacle Pd on or around the crosswalk Z, at a time of stopping or after the stopping of the subject vehicle CS. In this case, the term "stopping", "stop", "stopped", or the like of the subject vehicle CS is provided as any one of the following situations: (a) a complete stop of the subject vehicle CS with its speed measured as 0 km/h, (b) a travel of the subject vehicle CS measured at a travel speed of 5 to 7 km or the like, which is equal to or under a certain threshold travel speed, and (c) a travel of the subject vehicle CS measured at or under a lowest detectable speed of a speed sensor. Either one of (a), (b), and (c) is considered a stopping of the subject vehicle CS.

Figure 1:
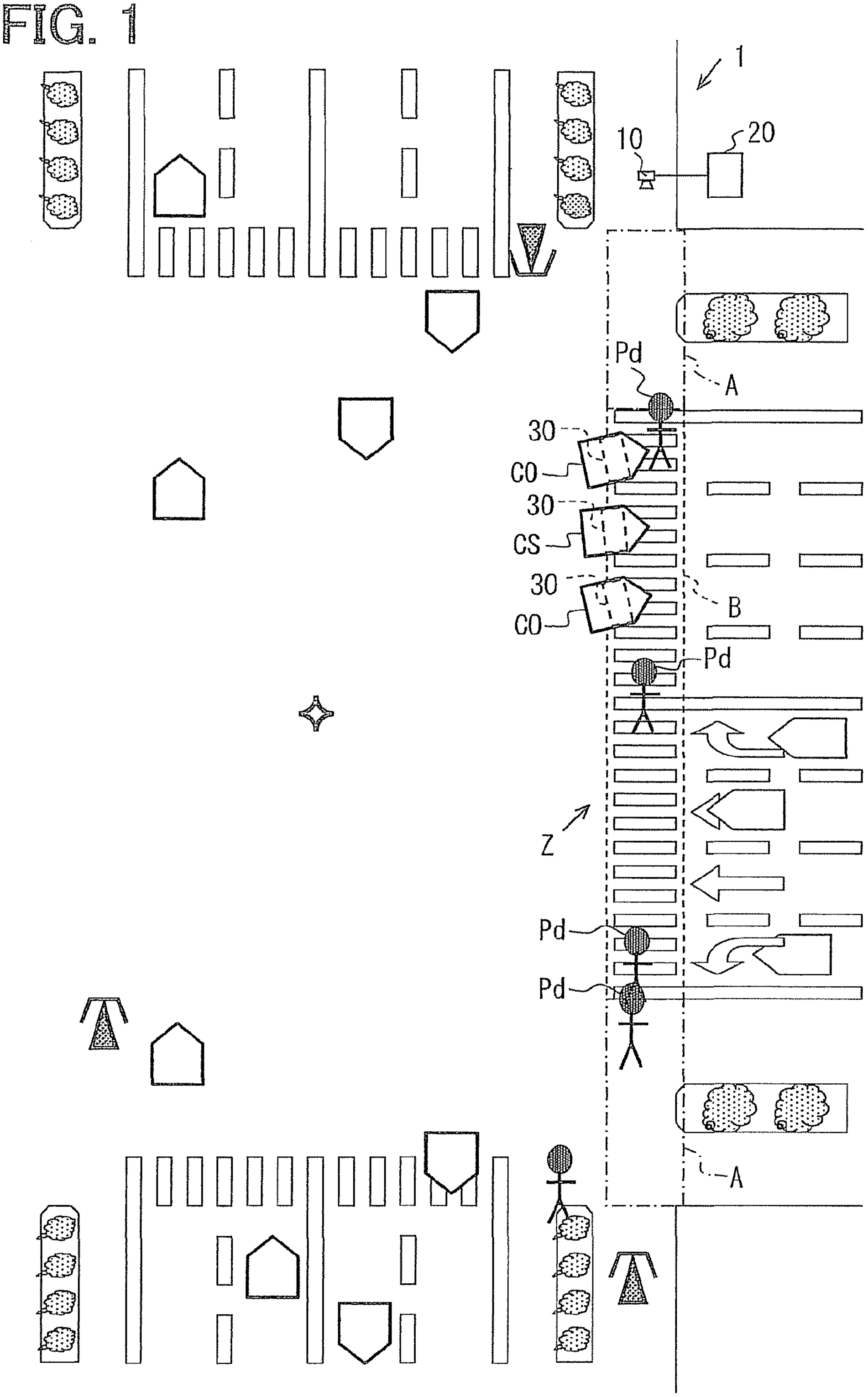
FIG. 1 an illustration of an intersection that includes an obstacle notification system of the present disclosure.
Figure 2:
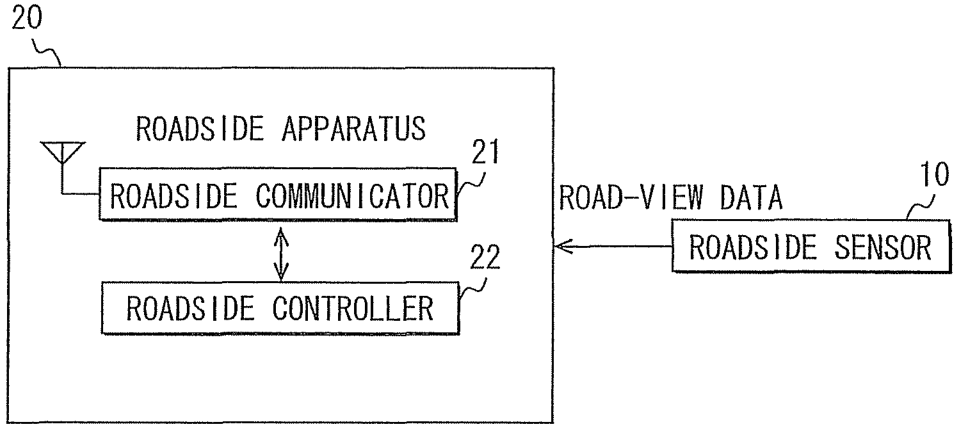
FIG. 2 is a block diagram of a roadside apparatus of the present disclosure.
Figure 3:
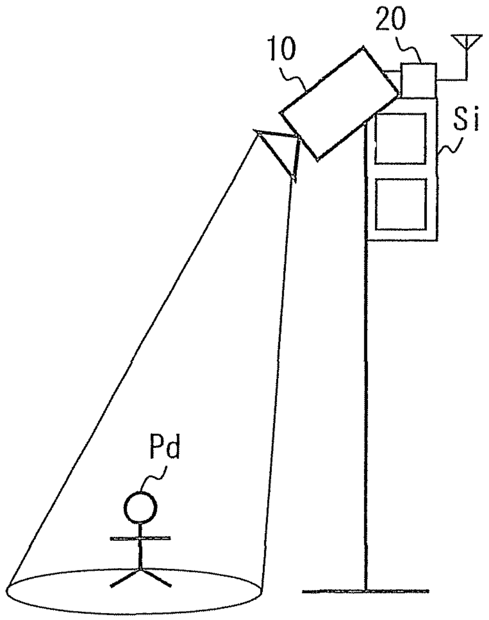
FIG. 3 is an illustration of the roadside apparatus of the present disclosure.

With reference to FIGS. 1 to 3, the obstacle information system 1 includes the roadside apparatus 20 and an in-vehicle apparatus 30 installed in the subject vehicle CS or in another vehicle CO. In the following, the vehicles including the subject vehicle CS and the other vehicles CO may collectively be designated as vehicle C in the following.

The roadside apparatus 20 is coupled to a roadside sensor 10, and acquires a road-view data from the roadside sensor 10. The roadside sensor 10 is coupled to a pedestrian signal Si (FIG. 3), and detects an obstacle on and around a crosswalk (e.g., a pedestrian Pd) with its position and height. For example, the roadside sensor 10 may be implemented as a camera for imaging a field including the crosswalk and its surroundings. Further, a separate roadside sensor 10 maybe used to provide data regarding vehicles entering and leaving the intersection. Such roadside sensor 10 may also be implemented as an imaging device such as a camera. Further, the roadside apparatus 20 is also coupled to the signal Si in the present embodiment. Note that FIG. 1 only depicts a situation of a left-side traffic in some countries in which the vehicle travels on the left side of the road. However, the present disclosure may be applicable to both of the right-side traffic and the left-side traffic, due to its structural symmetry regarding the traffic and regarding the vehicle body.

In FIG. 1, the roadside sensor 10 has a detection areas shown as an area A, which is in a dashed line, and an area B, which is shown in a broken line. The area A includes areas on both sides of a crosswalk Z, and the area B is an area on the crosswalk Z. When the sensor 10 is provided as a camera, the areas A and B are captured as camera images, and the captured camera images are provided to the roadside apparatus 20 one by one as image information. The area A is intended to include pedestrians on both sides of the crosswalk Z, where the pedestrians are waiting for the signal Si to turn. Accordingly, the area A is not necessarily limited to the exact outlined area shown in FIG. 1. The area B in the present embodiment includes not only the area on the crosswalk Z, but also the area around the crosswalk Z, thereby including the pedestrians who are substantially using the crosswalk Z to cross the street.

The roadside apparatus 20 includes, as shown in FIG. 2, a roadside communicator 21 and a roadside controller 22. The roadside communicator 21 has a well-known antenna, and performs wireless communication, such as road-to-vehicle communication, with the in-vehicle apparatus 30 of the vehicle C. The roadside controller 22 is a well-known computer having a CPU and a built-in memory, and realizes various functions by executing in the CPU a program memorized in the built-in memory. Specifically, the roadside controller 22 controls the roadside sensor 10 to detect and output the road-view data one by one for the acquisition of such information in order for the acquired information to be transmitted to the in-vehicle apparatus 30 from the roadside communicator 21 one by one.

Figure 4:
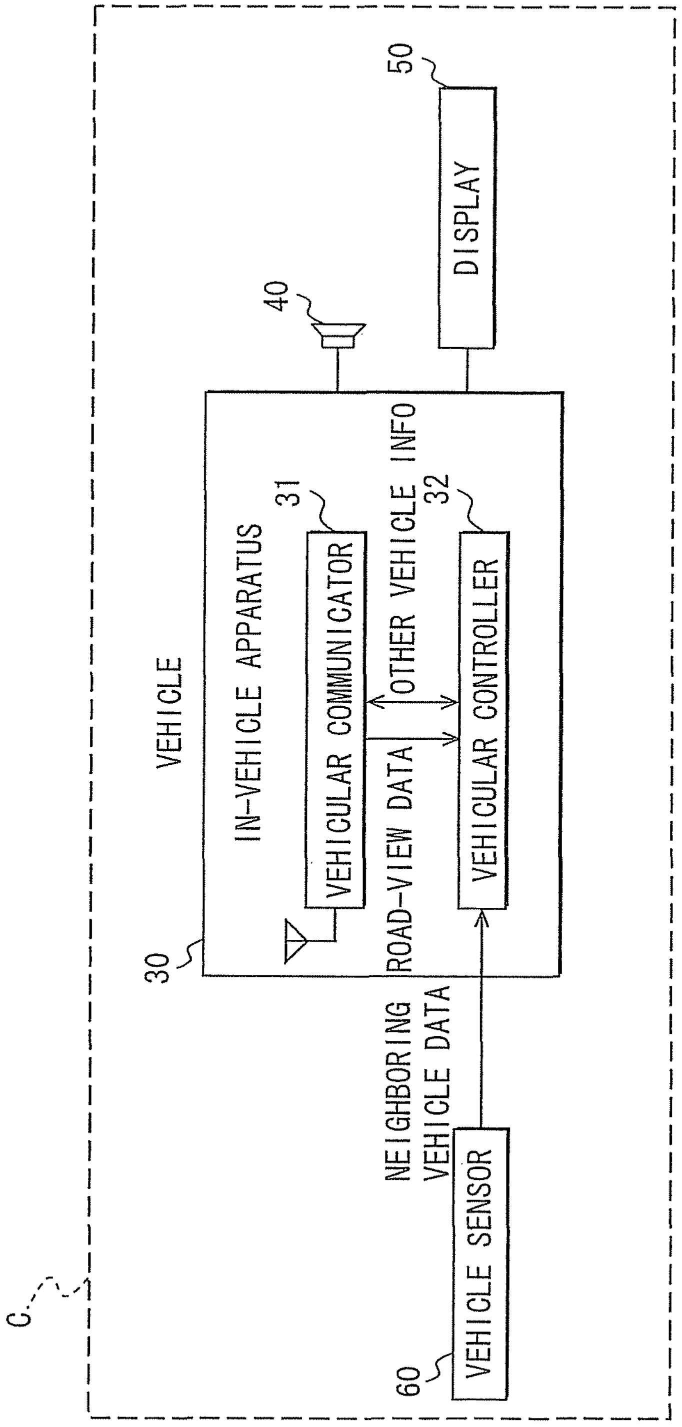
FIG. 4 is a block diagram of an obstacle notification apparatus that includes an in-vehicle apparatus.

With reference to FIG. 4, the obstacle notification apparatus includes the in-vehicle apparatus 30, which is coupled to, a speaker 40, a display 50 and a vehicle sensor 60. The in-vehicle apparatus 30 includes a vehicular communicator 31 and a vehicular controller 32.

The speaker 40 is a well-known type speaker installed at an appropriate position in the compartment of the subject vehicle CS, and the display 50 is a well-known type display, such as an LCD display, installed also at an appropriate position in the compartment of the subject vehicle CS.

The vehicle sensor 60 detects the vehicle CO next to the subject vehicle CS. The vehicle sensor 60 is implemented as a supersonic wave sensor, but may also be implemented as a millimeter wave sensor, a laser sensor, a camera, or the like. The vehicle sensor 60 may be installed on a side surface of the subject vehicle CS at its center between the front and the back or at another position, and is coupled to the in-vehicle apparatus 30. When the vehicle sensor 60 detects the vehicle CO next to the subject vehicle CS, it provides a neighboring vehicle data regarding the vehicle CO, which includes the presence and position of the vehicle CO, to the in-vehicle apparatus 30.

The vehicular communicator 31 has a well-known type of antenna, and performs wireless communication, such as a road-to-vehicle communication with the roadside apparatus 20 and vehicle-to-vehicle communication with the vehicle(s) CO. When the vehicular communicator 31 receives the road-view data from the roadside apparatus 20, the vehicular communicator 31 provides the road-view data to the vehicular controller 32. Further, when the vehicular communicator 31 receives another vehicle information from the vehicle CO, it outputs the other vehicle information to the vehicular controller 32. Also, the vehicular communicator 31 provides data, such as the neighboring vehicle data from the vehicle sensor 60, to the vehicle CO by way of the vehicular communicator 31.

Figure 5:
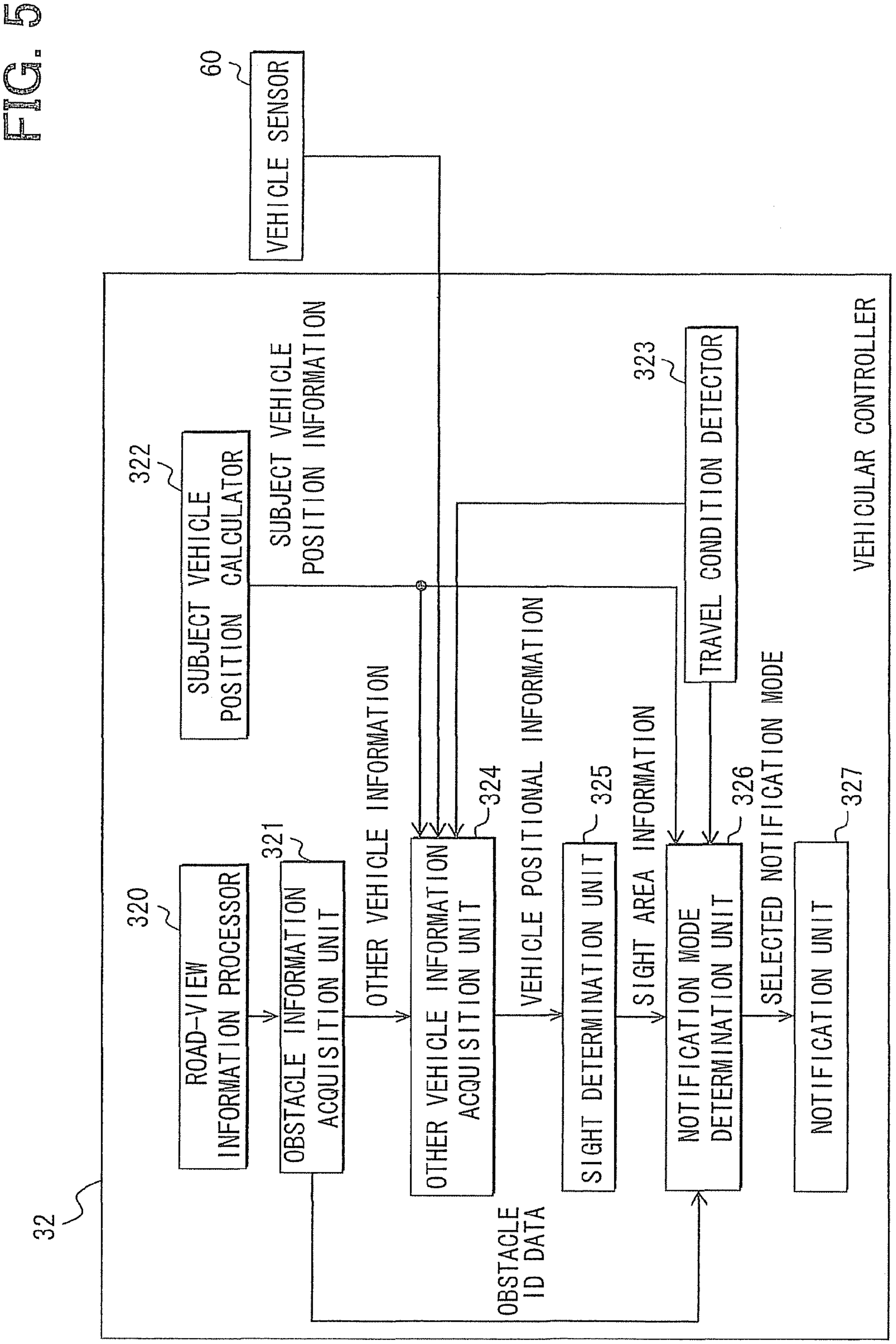
FIG. 5 is a block diagram of a vehicular controller of the present disclosure.

The vehicular controller 32 is a computer having a well-known type CPU and a built-in memory, and realizes various functions by executing, in the CPU, a program memorized in the built-in memory. Such a function of the vehicular controller 32 includes, as shown in FIG. 5, a road-view information processor 320, an obstacle information acquisition unit 321, a subject vehicle position calculator 322, a travel condition detector 323, another vehicle information acquisition unit 324, a sight determination unit 325, a notification mode determination unit 326 and a notification unit 327. Further, the above-described built-in memory functions as a memory unit in claims, and stores the above-described program as well as the vehicle height information indicative of the height of the vehicle, which is defined as a height from a road-contacting surface of the tire to an upper most portion of the subject vehicle CS shown in FIG. 7.

The road-view information processor 320 receives the road-view data from the vehicular communicator 31. The road-view information processor 320 analyzes the road view data to determine if an obstacle is present, and if so, provides an obstacle identification (ID) data, which includes the type/kind of the obstacle, the position of the obstacle, the height of the obstacle, and similar type of information regarding the obstacle. The obstacle ID data may be referred to as the obstacle information.

An obstacle is provided as any object that may collide with the vehicle C when the vehicle C travels on the road. The obstacle may be a moving object or, even a standing object that is temporarily not moving. However, the obstacle does not include a fixed object, such as a pedestrian signal, a building, a telephone pole, a tree, and the like. Such fixed objects are not detected and are not considered "obstacle". Accordingly, by way of example, a pedestrian waiting on both sides of the crosswalk Z in a standing condition and a pedestrian walking across the street on the crosswalk Z are considered as the obstacle, which may collide with the vehicle C. Further, the vehicle CO is of course included as the obstacle for the subject vehicle SC. The road-view information processor 320 distinguishes the above-described obstacles from the fixed objects based on the road-view data acquired from the roadside apparatus 20, by tracking and determining the position of the object one by one. As an alternative, the roadside apparatus 20 may include the function of the road-view information processor 320, and accordingly, may provide information regarding the obstacle to the in-vehicle apparatus 30.

The road-view information processor 320 provides the obstacle information acquisition unit 321 with the obstacle ID data. Once, the obstacle information acquisition unit 321 receives the information regarding an obstacle Pd, such as a pedestrian, the obstacle information acquisition unit 321 provides the obstacle ID data to the notification mode determination unit 326.

The obstacle information acquisition unit 321 further receives the other vehicle information related to the vehicle CO from the vehicle CO by way of the vehicular communicator 31 through the vehicle-to-vehicle communication. When the obstacle information acquisition unit 321 acquires the other vehicle information, the obstacle information acquisition unit 321 outputs the other vehicle information regarding the vehicle CO to the other vehicle information acquisition unit 324.

The subject vehicle position calculator 322 calculates the position of the subject vehicle CS one by one in time. The position of the subject vehicle CS may be calculated based on information from a navigation apparatus (not illustrated) or an intersection map transmitted from the roadside apparatus 20 and an optical beacon (not illustrated), which positions the subject vehicle CS relative to an intersection at a time of passing the optical beacon and afterwards according to the travel speed and the travel time of the subject vehicle CS. The navigation apparatus itself may be used as the subject vehicle position calculator 322. In addition, an in-vehicle camera may also be used to determine the position of the subject vehicle CS based on an image of the surrounding area of the subject vehicle CS, and such image may be analyzed to determine the position of the subject vehicle CS relative to the crosswalk Z. After the position of the subject vehicle CS is determined, the position information of the subject vehicle CS is provided to the other vehicle information acquisition unit 324.

The travel condition detector 323 successively in time detects a travel condition of the subject vehicle CS, such as whether the subject vehicle CS is stopping or moving/traveling. The travel condition of the subject vehicle CS may be detected based on a signal from a vehicle speed sensor (not illustrated). Further, the travel condition may also be detected based on successive acquisitions of the position of the subject vehicle CS from the subject vehicle position calculator 322 and determining whether the position of the subject vehicle CS had changed based on the position information of the subject vehicle CS. When the subject vehicle CS is in the stopping condition, a transition from the stopping condition to the traveling condition may be detected based an the actuation or pressing of the accelerator, which is detected by a sensor, or based on the degree at which the throttle value is open, which corresponds to the accelerator pedal pressing amount, thereby determining that the vehicle is in a traveling condition upon detecting the acceleration of the subject vehicle CS based on the above signals. Further, the traveling of the subject vehicle CS may also be based on the release or the amount of pressure being applied to the brake pedal or the pressure of the brake fluid to determine if the brake is being released, which may also be detected by a sensor.

The other vehicle information acquisition unit 324 receives information regarding the presence of the vehicle CO around the subject vehicle CS, when the subject vehicle CS is in a stopping condition in front of the crosswalk Z. Specifically, the other vehicle information acquisition unit 324 receives information regarding the vehicle CO from the obstacle information acquisition unit 321 and receives information regarding the position of the subject vehicle CS from the subject vehicle position calculator 322. Based on the positions of the subject vehicle CS and the vehicle CO, the other vehicle information acquisition unit 324 determines whether the vehicle CO exists on the left or right side of the subject vehicle CS, and outputs a vehicle positional information that reflects such determination. Additionally, the other vehicle information acquisition unit 324 receives additional information regarding the vehicle CO from the vehicle sensor 60.

Figure 14:
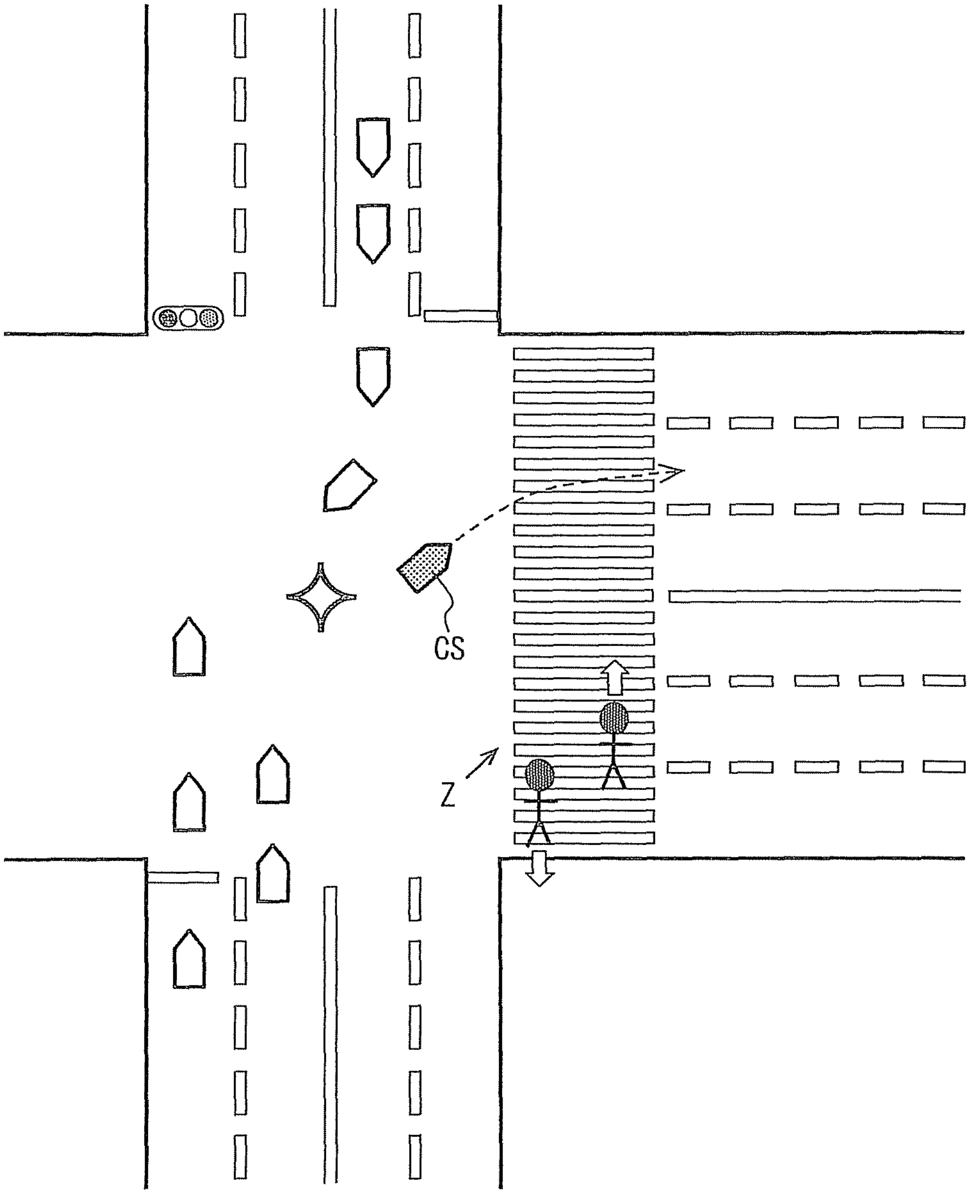
FIG. 14 is an illustration of an intersection that includes a subject vehicle CS of the present disclosure.

With reference to FIG. 14, the position of the subject vehicle CS is defined in the following manner. When the subject vehicle CS is positioned in front of the crosswalk Z, it means that the subject vehicle CS has not passed the crosswalk Z and the subject vehicle CS is close to the crosswalk Z. Further, the distance between the subject vehicle CS and the crosswalk Z may be determined by examining that the position of the subject vehicle CS is outside of a road width of the intersection entering road, or, in other words, the position of the subject vehicle CS is in an intersection exiting road that crosses the intersection entering road (no picture) Such determination may be directly performed based on the position of the subject vehicle CS relative to the intersection entering road, or may be performed indirectly based on the position of the subject vehicle CS relative to the crosswalk Z.

Figure 6A:
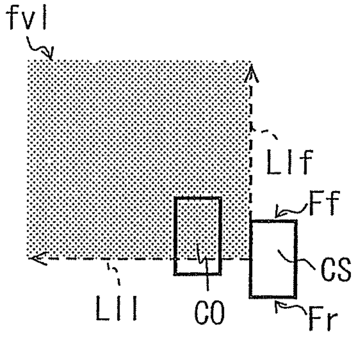
FIG. 6A is an illustration of a sight of a driver on a left side of a vehicle of the present disclosure.
Figure 6B:
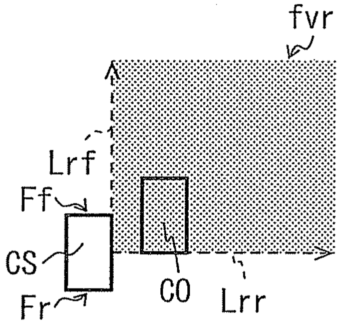
FIG. 6B is an illustration of a sight of a driver on a right side of a vehicle of the present disclosure.
Figure 6C:
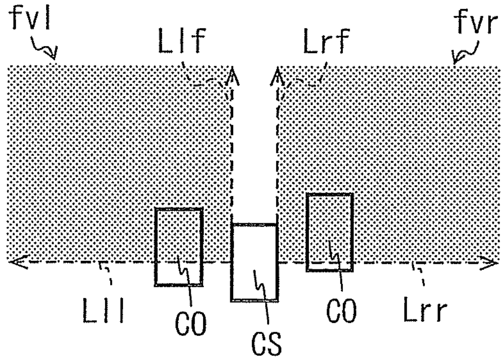
FIG. 6C is an illustration of a sight of a driver on both sides of a vehicle of the present disclosure.

With reference to FIGS. 6A, 6B, and 6C, a process performed by the other vehicle information acquisition unit 324 to determine the vehicle positional information is explained. Based on the position of the vehicle CS and the vehicle CO, the other vehicle information acquisition unit 324 determines that the vehicle CO exists on the left side of the subject vehicle CS when (a) the vehicle CO is at least partially on a straight line Ll1 that is drawn perpendicularly from a longitudinal center of the subject vehicle CS towards the left, and (b) the vehicle CO is within a predetermined distance from the subject vehicle CS (FIGS. 6A and 6C). When such conditions are fulfilled, the vehicle CO is determined to exist on the left side of the subject vehicle CS, and the other vehicle information acquisition unit 324 produces the vehicle positional information indicating the presence of the vehicle CO on the left side of the subject vehicle CS.

Similarly, as shown in FIGS. 6B and 6C, the other vehicle information acquisition unit 324 uses the information regarding the position of the subject vehicle CS and the vehicle CO, to determine that the vehicle CO is on the right side of the subject vehicle CS when, (a) the vehicle CO is at least partially on a straight line Lrr that is drawn perpendicularly from a longitudinal center of the vehicle CS toward the right and (b) the vehicle CO is within a predetermined distance from the vehicle CS. When such conditions are fulfilled, the vehicle CO is determined to exist on the right side of the subject vehicle CS, and the other vehicle information acquisition unit 324 produces the vehicle positional information indicating the presence of the vehicle CO on the right side of the subject vehicle CS. The other vehicle information acquisition unit 324 performs the described analysis for each of the vehicle CO that are detected or provided by (1) the road-view data from the road sensor 10; (2) the neighboring vehicle data from the vehicle sensor 60; and (3) the other vehicle information provided by a vehicle CO. The other vehicle information acquisition unit 324 provides the vehicle positional information to the sight determination unit 325.

Further, in the present embodiment, the left side of the subject vehicle CS is defined by the straight line Lll extending perpendicularly on the left side from the longitudinal center of the subject vehicle CS and the right side of the subject vehicle CS is defined by the straight line Lrr extending perpendicularly on the right side from the longitudinal center of the vehicle CS. However, such definition of the left side and the right side may be modified. That is, for example, a line drawn in parallel with a front end face Ff or a rear end face Fr of the subject vehicle CS may be extended toward the left or the right, for defining the left and right. That is, if an object is on such leftward extended line, such object may be defined on the left side of the subject vehicle CS. Similarly, if an object is on such rightward extended line, such object may be defined on the right side of the subject vehicle CS.

Further, in the present embodiment, the above-described predetermined distance between the vehicle CS and the vehicle CO may be the width of the subject vehicle CS, or may be a different distance from the width of the subject vehicle CS. In other words, the predetermined distance may be a certain distance that affects the sight of the driver D who is sitting in a driver's seat of the subject vehicle CS if the vehicle CO exists on the left/right side of the subject vehicle CS.

The other vehicle information acquisition unit 324 provides the vehicle positional information to the sight determination unit 325. The sight determination unit 325 determines the driver's sight, which is a visually perceptible area of the driver D. Additionally, the other vehicle information acquisition unit 324, transmits the vehicle positional information to the vehicle CO by way of the vehicular communicator 31. Further, when the neighboring vehicle data is generated by the vehicle sensor 60, the neighboring vehicle data is transmitted to the vehicle CO by the vehicular communicator 31.

When the vehicle CO is determined to be positioned on the left side of the subject vehicle CS, the sight determination unit 325 defines a left-side area. Specifically, the left side area, as shown in FIG. 6A, is defined between the line Lll and a line Llf, where the line Llf extends in the front forward Ff direction of the subject vehicle CS on the left side surface of the vehicle CS, such that is perpendicular with line Lll. The area defined between the line Llf and line Lll is provided as a left off-sight area fvl, which is shaded in FIGS. 6A and 6C. When the vehicle CO is determined to be positioned on the right side of the subject vehicle CS, the sight determination unit 325 defines a right-side area. Specifically, the right side area, as shown in FIG. 6B, is defined between the line Lrr and a line Lrf, where the line Lrf, like line Llf, extends in the front forward Ff direction of the subject vehicle CS, but on the right side surface of the subject vehicle CS, such that Lrf is perpendicular with Lrr. The area defined between the line Lrf and line Lrr is provided as a right off-sight area (fvr), which is shaded in FIGS. 6A and 6C. In FIG. 6C, the subject vehicle CS is positioned to a vehicle CO in the left off-sight area (fvl) and a vehicle CO in the right off-sight area (fvr).

Figure 7:
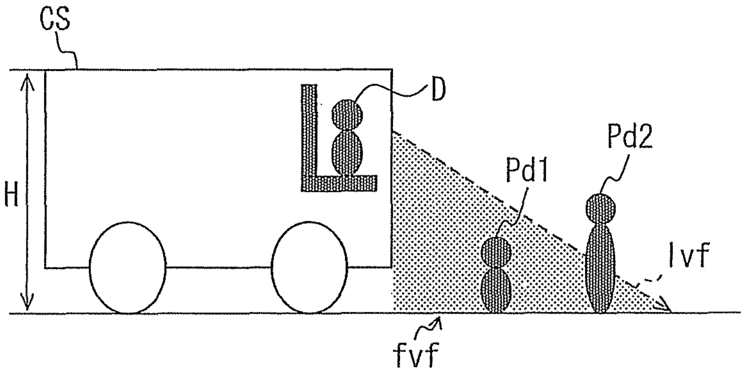
FIG. 7 is an illustration of a dead angle on a frontward side of the vehicle of the present disclosure.

The sight determination unit 325 receives the height of the subject vehicle CS from the built-in memory, and, based on the height of the subject vehicle CS, determines a dead angle range of the subject vehicle CS in the vehicle front, and determines such range as a front off-sight area (fvf). FIG. 7 illustrates the front off-sight area fvf (shaded area), which is an area that is out of sight of the driver D in front of the subject vehicle CS. Specifically, the off-sight area fvf is an area that can not be seen by the driver D. A broken line lvf in FIG. 7 indicates a boundary of the driver's sight when the driver D sits in the driver's seat in a forward looking position. That is, an area above the line lvf is a sight recognizable by the driver D of the subject vehicle CS, and a shaded area below the line lvf is a sight not recognizable by the driver D unless he/she pitches forward. Since such line lvf is determined based on the height of the eye of the driver, which is subject to the differences among individuals, the height (H) of the vehicle is used as the height of the driver D's eye in the present embodiment. The height of the driver's eye may be calculated by multiplying a predetermined value on the vehicle height, for the determination of the line lvf. Then, the area below the line lvf is determined as the dead angle, that is, the off-sight area M.

The sight determination unit 325 transmits a sight area information that includes the left off-sight area fvl, the right off-sight area fvr, and the front off-sight area fvf, which may be referred to as the off-sight areas fvl, fvr, fvf, to the notification mode determination unit 326.

The notification mode determination unit 326 receives the position and the travel condition of the subject vehicle CS from the subject vehicle position calculator 322 and the travel condition detector 323, respectively. When the subject vehicle CS is determined to be stopping in front of the crosswalk Z, as described above, the notification mode determination unit 326 selects a notification mode that is provided to the driver D to alert the driver of an obstacle, and calls for the driver D's attention towards the obstacle Pd.

The notification mode determination unit 326 also receives the obstacle ID data for the obstacle Pd, which provides the position and height information of the obstacle Pd, from the obstacle information acquisition unit 321, and receives the sight area information, which includes the off-sight area fvl, fvr, fvf, from the sight determination unit 325.

Based on the information received, the notification mode determination unit 326 determines the proper notification mode to provide the driver D. Specifically, when the obstacle Pd exists in one of the off-sight areas fvl, fvr, or fvf, the notification mode determination unit 326 sets the notification mode for alerting the driver D of the obstacle Pd to an intensive notification mode. On the other hand, when the obstacle Pd is not positioned in any of the three off-sight areas fvl, fvr, or fvf, the notification mode determination unit 326 sets the notification mode for alerting the driver D of the obstacle Pd to a moderate notification mode. The intensive notification mode, in comparison to the moderate notification mode, provides a stronger alert and calls for a higher attention level of the driver D in regards to the obstacle Pd.

For example, with reference to FIG. 7, when the height of an obstacle Pd1 is below the straight line lvf at the position of the Obstacle Pd1 which may be the case when the obstacle Pd1 is a child or an animal, the notification mode may be provided in the intensive notification mode. On the other hand, when the height of an obstacle Pd2 is above the straight line lvf at the position of the obstacle Pd2, which may be the case when the obstacle Pd2 is an adult, the obstacle is not considered in the off-sight area fvf. That is, the obstacle Pd2 is positioned in the sight of the driver D, and the notification mode may be provided as a moderate notification mode.

In addition to the moderate notification mode and the intensive notification mode, the notification mode determination unit 326 may also select a severe notification mode and attention calling mode. When the intensive notification mode is being provided during a stopping condition of the subject vehicle CS, and the subject vehicle CS begins to accelerate or starts traveling, the notification mode determination unit 326 issues the severe notification mode to further alert the driver D of the presence of the obstacle Pd. The severe notification mode provides a stronger alert to the driver D in comparison to the intensive notification mode, and calls for a higher vigilance of the driver D in regards to the obstacle Pd.

When the moderate notification mode is being provided during a stopping condition of the subject vehicle CS and the subject vehicle CS begins to accelerate or starts traveling, the notification mode determination unit 326 issues the attention calling mode to further alert the driver D of the presence of the obstacle Pd. The attention calling mode calls for a higher attention of the driver D in comparison to the moderate notification mode, and calls for lower attention of the driver D in comparison to the intensive notification mode. Therefore, the level of the alert and the degree of attention called for of the driver D increases from the moderate notification mode to the attention calling mode to the intensive notification mode to the severe notification mode, with the severe notification mode as the highest/strongest alert.

Further, the start of travel of the subject vehicle CS can be detected as any of the methods describe above regarding travel condition, such as a decrease of the pressure applied to a brake pedal or an increase of pressure applied to an acceleration pedal. Therefore, the notification mode determination unit 326 provides the notification in the severe notification mode when the amount of pressure applied to the brake pedal is decreased and the current notification mode is the intensive notification mode. Further, the notification mode determination unit 326 provides the notification in the intensive notification mode when the amount of pressure applied to the brake pedal is decreased and the current notification mode is the attention calling mode.

The notification mode determination unit 326 provides information regarding a selected notification mode to the notification unit 327.

The notification unit 327 is coupled to the speaker 40 and the display 50. The notification unit 327 operates the speaker 40 and the display 50 to perform the selected notification mode by the notification mode determination unit 326 in order to alert the driver D of the obstacle Pd. In this case, the speaker 40 and the display 50 correspond to a notification unit in claims.

Figure 8A:
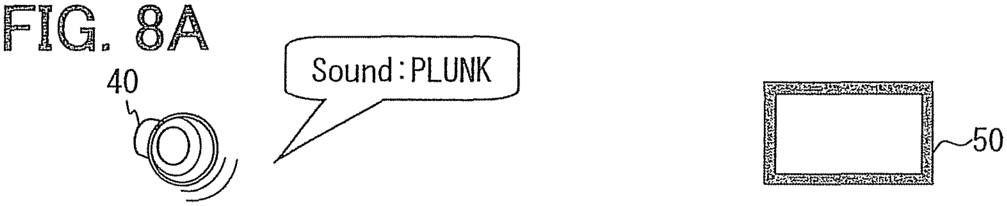
FIG. 8A is an illustration of a moderate notification mode provided by the in-vehicle apparatus of the present disclosure.

The notification modes as describe above are further described with reference to FIGS. 8A, 8B, 8C and 8D. With reference to FIG. 8A, when the moderate notification mode is selected by the notification mode determination unit 326, the notification unit 327 outputs a sound from the speaker 40 and no notification message or image is displayed on the display 50. The notification sound may be a deep or low sound like a "pawn".

Figure 8B:
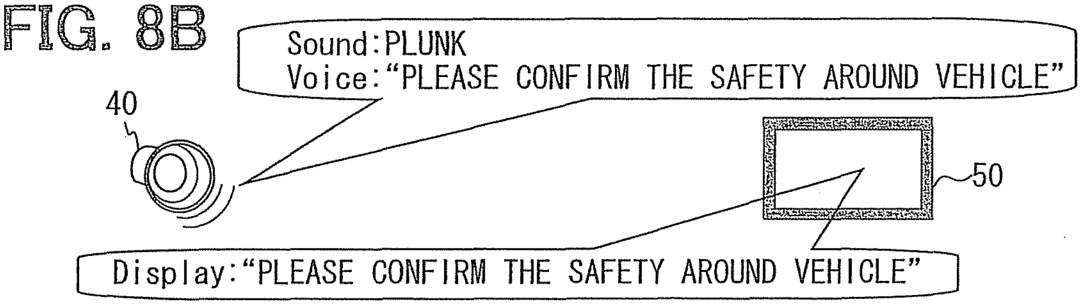
FIG. 8B is an illustration of an attention calling mode provided by the in-vehicle apparatus of the present disclosure.

With reference to FIG. 8B, when the attention calling mode is selected, the notification unit 327 outputs from the speaker 40 a sound with a voice and displays a message or image on the display 50. The sound may be the same sound used for the moderate notification mode, the voice may say "Please confirm the safety around the vehicle", and the display 50 may display the message "Please confirm the safety around the vehicle".

Figure 8C:
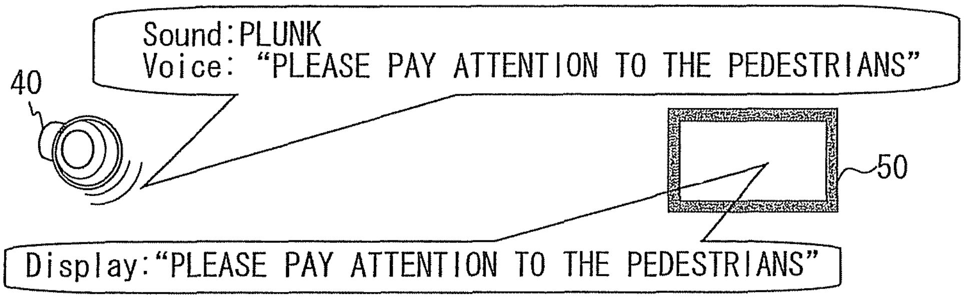
FIG. 8C is an illustration of an intensive notification mode provided by the in-vehicle apparatus of the present disclosure.

With reference to FIG. 8C, when the intensive notification mode is selected, the notification unit 327 outputs a sound and a voice from the speaker 40, and displays a message or image on the display 50. The notification sound may be the same as the moderate notification, and the voice may say "Please pay attention to the pedestrians." The display 50 may display "Please pay attention to the pedestrians".

Figure 8D:
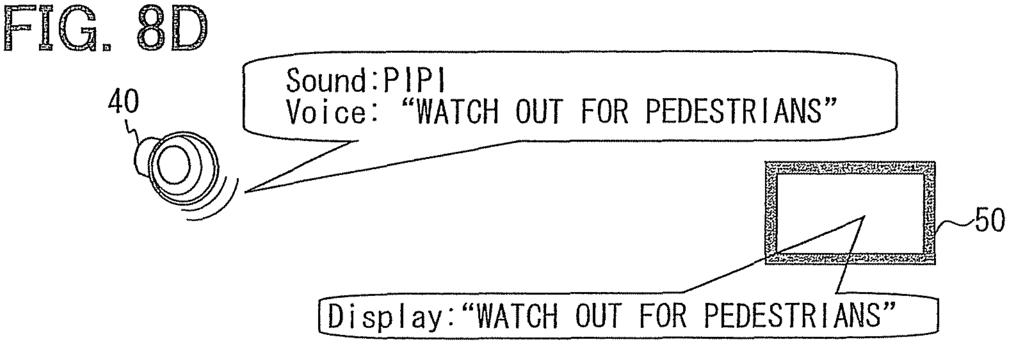
FIG. 8D is an illustration of a severe notification mode provided by the in-vehicle apparatus of the present disclosure.

With reference to FIG. 8D, when the severe notification mode is selected, the notification unit 327 outputs a sound and a voice from the speaker 40, and displays a message or image on the display 50. The sound may be a high tone sound like "pipi", and the voice may say "Watch out for pedestrians", and the display 50 may display "Watch out for pedestrians".

With reference to FIGS. 9 to 13, a roadside apparatus process S100 and an in-vehicle apparatus process S200 performed by the roadside apparatus 20 and the in-vehicle apparatus 30, respectively, are explained in the following.

Figure 9:
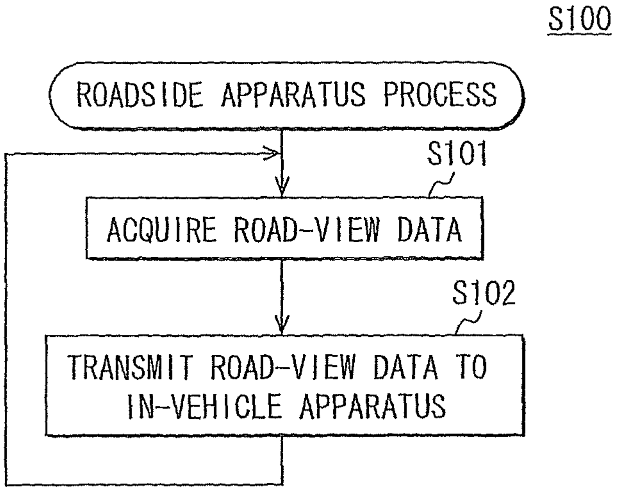
FIG. 9 is a flowchart of a roadside apparatus process of the present disclosure.

The roadside apparatus 20 continuously performs the roadside apparatus process S100 of FIG. 9. In step S101, the roadside apparatus 20 receives the road-view data from the roadside sensor 10, and transmits the road-view data to the vehicle C in step S102. The roadside apparatus 20 returns to step S101 to perform the roadside apparatus process S100 again.

Figure 10:
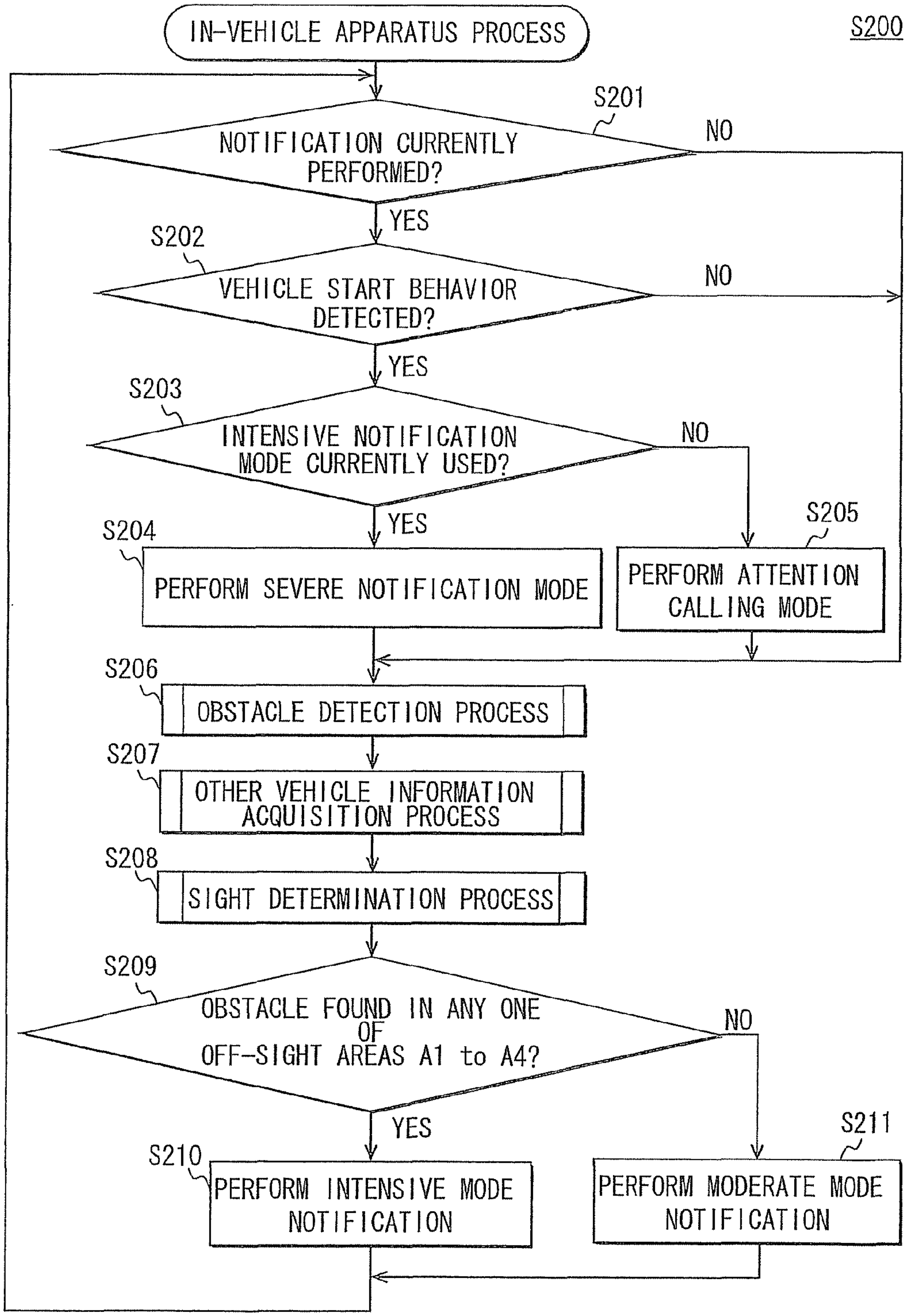
FIG. 10 is a flowchart of an in-vehicle apparatus process of the present disclosure.

In FIG. 10, the in-vehicle apparatus process S200 is described. The in-vehicle apparatus 30 starts the in-vehicle apparatus process S200 based on a fulfillment of a support provision condition. For example, the support provision condition may include (a) the subject vehicle CS is in a support service zone, and (b) a right turn signal is being turned ON, and may further include (c) the vehicle CS is in the stop condition in front of the crosswalk Z. In the above, the support provision condition and the support service zone indicates an area where a driver of the vehicle C is able to receive information from the roadside apparatus 20, and, therefore, the driver of the vehicle C is aided as it travels across the cross walk.

The support service zone may be an area between a predetermined position before the intersection and a predetermined position after a right turn, and a start position of the support service zone may be determined based on a distance from the intersection and/or position coordinates, or may be determined based on an optical beacon passing position (not illustrated) and/or a signal reception position for receiving a signal from the roadside apparatus 20. When the distance from the intersection is used to define a start position of the support service zone, such start position may be pre-stored in map information, and the start position is detected based on the current position information acquired by a navigation apparatus. An end position of the support service zone may also be determined based on a distance from the intersection and/or position coordinates, or may also be determined based on a distance from the start position of the support service zone.

When it is determined that the vehicle C has passed the end position of the support service zone, the in-vehicle apparatus process S200 in FIG. 10 is completed.

When the subject vehicle CS meets the support provision condition the in-vehicle apparatus 30 performs the in-vehicle apparatus process S200. With reference to FIG. 10, the process, in step S201, determines whether the speaker 40 and/or the display 50 are performing a notification, as describe above. When it is determined that a notification is not being carried out (S201: NO), the in-vehicle apparatus 30 performs an obstacle acquisition process S206, which is provided in FIG. 11. When a notification is being performed (S201: YES) the process continues to step S202.

In step S202, the in-vehicle apparatus 30 determines whether the subject vehicle CS is about to move or accelerate, which can be detected by the travel condition detector 323, as described above. For example, the subject vehicle CS may be considered to move by a decrease of pressure applied to the brake pedal by the driver D. When the start of travel of the subject vehicle CS is not detected (S202: NO), the in-vehicle apparatus 30 performs the obstacle acquisition process S206 of FIG. 11. On the other hand, when the start of travel of the subject vehicle CS is detected (S202: Yes) the process continues to step S203.

In step S203, the in-vehicle apparatus 30 determines whether the speaker 40 and/or the display 50 are executing the intensive notification mode. When the intensive notification mode is being executed (S203: YES), the process continues to S204 where the in-vehicle apparatus 30 performs the notification in the severe notification mode, after which the in-vehicle apparatus 30 performs the obstacle acquisition process S206 of FIG. 11. On the other hand, when it is determined that the notification is not being performed in the intensive notification mode, that is, when it is determined that the notification is being performed in the moderate notification mode (S203: NO), the in-vehicle apparatus 30, in step S205, performs the notification in the attention calling mode, and then continues to the obstacle acquisition process S206 of FIG. 11.

Figure 11:
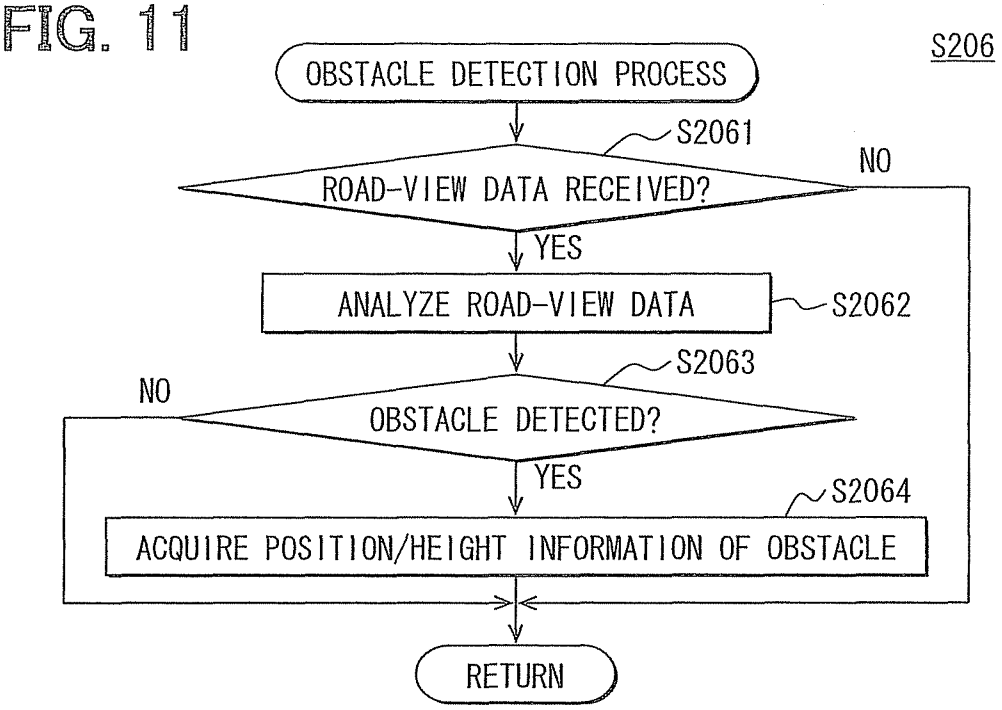
FIG. 11 is a flowchart of an obstacle acquisition process of FIG. 10.

In the obstacle acquisition process S206 of FIG. 11, the in-vehicle apparatus 30, first determines, in step S2061, whether the road-view data from the roadside apparatus 20 has been received. When the road-view data has not been received (S2061: NO), the in-vehicle apparatus 30 continues to the other vehicle information acquisition process S207 of FIG. 12 (cf. FIGS. 10, 12). On the other hand, when the road-view data has been received (S2061: YES), the in-vehicle apparatus 30 continues to step S2062, and analyzes the road view data, as described under the sensor information processor 320, to determine if an obstacle is present.

In S2063, the in-vehicle apparatus 30 determines whether an obstacle Pd is present based on the analysis of the road-view data. When an obstacle Pd is present (S2063: YES), the in-vehicle apparatus 30, in step S2064, acquires the position information and the height information from the obstacle ID data of the obstacle Pd, and then continues to the other vehicle information acquisition process S207 of FIG. 12. On the other hand, when an obstacle Pd is not detected (S2063: NO) the in-vehicle apparatus 30 continues to the other vehicle information acquisition process S207 of FIG. 12.

Figure 12:
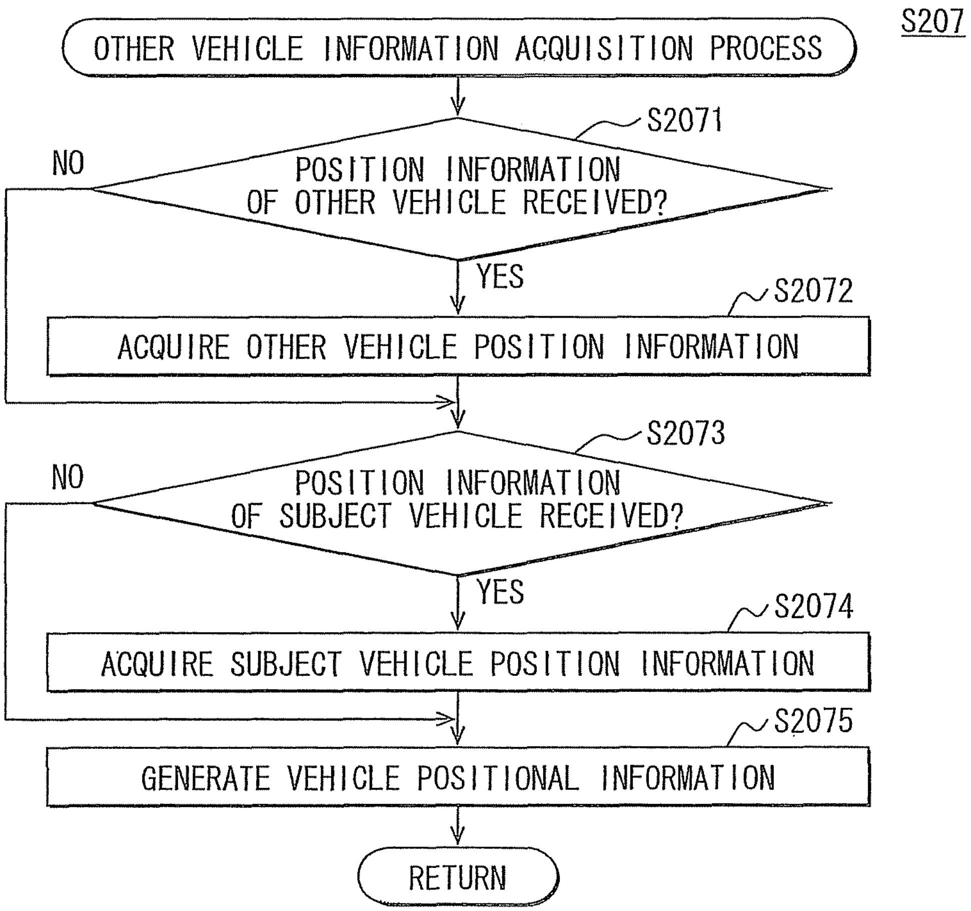
FIG. 12 is a flowchart of an other vehicle information acquisition process of FIG. 10.

In the other vehicle information acquisition process S207 of FIG. 12, the in-vehicle apparatus 30 determines, in S2071, whether the other vehicle information from the vehicle CO is received through the vehicle-to-vehicle communication by the vehicular communicator 31. When the other vehicle information of the vehicle CO is received (S2071: YES), the in-vehicle apparatus 30, in step S2072, acquires position information regarding the vehicle CO from the other vehicle information, and then continues to step S2073. On the other hand, when the other vehicle information has not been received (S2071: NO) the in-vehicle apparatus 30 continues to step S2073.

In step S2073, the in-vehicle apparatus 30 determines, whether the position information of the subject vehicle CS is received. Such information may be provided from a navigation apparatus or the like, as described above under the subject vehicle position calculator 322. When it is determined that the position information of the subject vehicle CS is received (S2073: YES), the in-vehicle apparatus 30, in step S2074, acquires the position information of the subject vehicle CS, and the in-vehicle apparatus 30 continues to S2075. On the other hand, when the position information of the subject vehicle CS has not been received (S2073: NO) the in-vehicle apparatus 30 continues to S2075.

Figure 13:
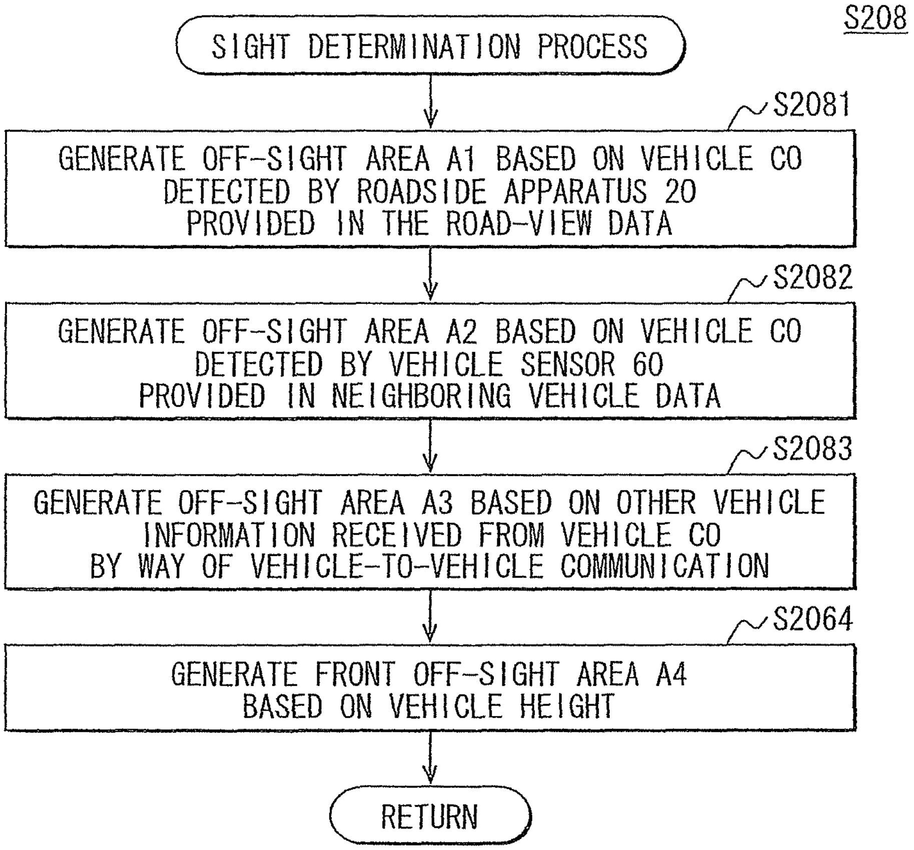
FIG. 13 is a flowchart of a sight determination process of FIG. 10.

In step S2075, the in-vehicle apparatus 30 uses the other vehicle information of the vehicle CO and/or the position information of the subject vehicle CS to generate the vehicle positional information, which is described in detail under the other vehicle information acquisition unit 324, and then continues to a sight determination process S208 of FIG. 13 (cf. FIGS. 10 and 12).

In the sight determination process S208 of FIG. 13, the in-vehicle apparatus 30, in step S2081, first generates a first off-sight area A1 based on a vehicle CO detected by the roadside apparatus 20, and provided in the road-view data to the in-vehicle apparatus 20. The first off-sight area A1 is provided as off-sight areas fvl and/or, fvr, and are determined by the process described above under the sight determination unit 325.

Afterwards, the in-vehicle apparatus 30, in step S2082, uses position information of a vehicle CO detected by the vehicle sensor 60 and provided in the neighboring vehicle data, to generate a second off-sight area A2. The second off-sight area A2 is also provided as off-sight areas fvl and/or fvr, and are determined by the process describe above under the sight determination unit 325.

Next, the in-vehicle apparatus 30, in step S2083, generates a third off-sight area A3 by using the other vehicle information from a vehicle CO, which is received through the vehicle-to-vehicle communication. In this case, the other vehicle information is the information generated or acquired by the in-vehicle apparatus 30 installed on the vehicle CO, and the third off-sight area A3 is also provided as off-sight areas fvl and/or, fvr, and are determined by the process describe above under the sight determination unit 325.

The in-vehicle apparatus 30, in step S2084, generates a fourth off-sight area A4 by using the vehicle height information of the subject vehicle CS stored in the built-in memory of the in-vehicle apparatus 30. In this case, the fourth off-sight area A4 described here is the above-described the front off-sight area fvf, as described under the sight determination unit 325.

After performing the sight determination process S208, the in-vehicle apparatus 30 continues to step S209 of FIG. 10 (cf. FIG. 10), and determines whether there is an obstacle in any one of the off-sight areas A1 to A4, as described above in the notification mode determination unit 326.

When an obstacle Pd is determined to be present in any one of the off-sight areas A1 to A4 (S209: YES), the in-vehicle apparatus 30, in step S210, performs the notification in the intensive notification mode, as described above, in order to notify the driver D of the subject vehicle CS of the presence of the obstacle that may not be visible to the driver D. On the other hand, when an obstacle is not present in any one of the off-sight areas A1 to A4 (S209: NO), the in-vehicle apparatus 30, in step S211, performs the notification in the moderate notification mode, as described above, in order to alert the driver D of the obstacle that is most likely visible to the driver. After performing either steps S210 or S211, the in-vehicle apparatus 30 returns to step S201 to perform the in-vehicle apparatus process S200.

According to the above-described embodiment, the selection of a notification mode for alerting the driver D to the presence of an obstacle Pd is based on the sight of the driver D and the position of the obstacle Pd, and the selected notification mode alerts the driver D, such that the driver D may be more vigilant or observant as the subject vehicle CS crosses the crosswalk Z. In this manner, in comparison to the notification of the obstacle Pd evenly provided in all situations, the notification of the obstacle Pd for the driver D of the subject vehicle CS is made to be nuisance-free.

Further, the in-vehicle apparatus 30 is configured to provide the notification in the intensive notification mode, which calls for higher degree of attention, when the obstacle Pd does not exist in the sight of the driver, rather than using the same notification mode, such as the moderate notification mode, when the obstacle Pd may be insight. When the obstacle Pd is in view of the driver D, the obstacle Pd should already be recognized by the driver D or at least the chances that the obstacle Pd is noticeable is higher. Accordingly, there is no need to provide a notification in the intensive notification mode. On the other hand, when the obstacle Pd is not insight or not visible to the driver D (i.e., when the obstacle is in an "off-sight" of the driver D), the driver D may not recognize the obstacle Pd or at least the chances that the obstacle Pd is noticeable is low. Accordingly, there is a need for calling the driver D's attention to the obstacle Pd by providing a notification. Therefore, when the above-described notification scheme is adopted, the obstacle notification is provided according to the degree of notification needed.

Further, when the subject vehicle CS begins to travel or accelerate from a stopping condition during an intensive notification mode, the notification is changed to the severe notification mode, which calls for higher attention of the driver D towards the obstacle Pd. In such obstacle notification scheme, the driver D is securely notified of the presence of the obstacle Pd, which the driver D may not have yet recognized.

Based on the foregoing, when the subject vehicle CS stops in front of the crosswalk Z, the driver D often confirms the position of the obstacle Pd. Therefore, the notification mode determination unit determines the notification mode of the obstacle Pd when a stop condition of the subject vehicle CS is detected, in addition to other conditions.

The notification mode determination unit may set the notification mode to a higher degree notification for an obstacle Pd that is out of sight of the driver D than for an obstacle Pd that is in sight of the driver D. When the obstacle is in the sight of the driver D, it is likely that the driver D takes notice of the obstacle Pd. That is, there is a lower need for calling for the driver D's attention to the obstacle Pd by providing the notification in such a situation. On the other hand, when the obstacle Pd is not in the sight of the driver D (i.e., when the obstacle is in an "off-sight" of the driver D), the driver D may not have taken notice of the obstacle Pd. That is, there is a higher need for calling the driver D's attention to the obstacle Pd by providing a different and stronger notification. In summary, when the above-described notification scheme is adopted, the obstacle Pd notification is provided according to the degree of necessity of notification needs.

The notification mode determination unit may set the notification mode to a higher degree notification, when the subject vehicle CS is determined to be moving by the travel condition detection unit than when the subject vehicle CS is detected to in a stopping condition. In other words, when the subject vehicle CS starts to move from a stopping condition, there is higher need to pay attention to the obstacle Pd.

In the above configuration, the sight of the driver D of the subject vehicle CS may be difficult to determine. Therefore, the driver D's sight may preferably be determined based on positional information of vehicle CO, which may be more than one. In such manner, the driver D's sight can be determined more accurately.

Specifically, when the vehicle CO exists on the left side of the subject vehicle CS, the sight of the driver D may be determined to include an area that precludes a part or all of the left side of the subject vehicle CS. Alternatively, when the other vehicle exists on the right side of the subject vehicle CS, the sight of the driver D may be determined to include an area that precludes a part or all of the right side of the subject vehicle CS. The scope of the left/right side of the subject vehicle SC is preferably defined to be within a couple of vehicle widths from the subject vehicle CS, and the side is not necessarily just the left/right side. That is, a diagonally frontward left side may be included in the scope of the left side.

Further, the obstacle notification apparatus may store height information of the subject vehicle CS, and the sight determination processor may determine a frontward sight of the driver D on a front side of the subject vehicle CS based on the height information. The sight of the driver D, especially the frontward sight on the vehicle's front side, may change depending on the vehicle height of the subject vehicle CS. Therefore, by storing the vehicle height and by determining the frontward sight of the driver D based on the stored height of the subject vehicle CS, the frontward sight of the driver D is accurately determined.

Further, an obstacle information acquisition unit may acquire obstacle information regarding the height of the obstacle Pd on and/or around the crosswalk, and the notification mode to be used by the notification unit may be determined based on the acquired height of the obstacle Pd and the sight of the driver D.

The above scheme is advantageous because, depending on the height of the obstacle Pd, the obstacle Pd may or may not be in the sight of the driver D, even when the relative positioning between the subject vehicle CS and the obstacle Pd is same. Therefore, by taking into account the height of the obstacle Pd, the notification mode is preferably determined based on accurately determining whether the obstacle Pd is included in the sight of the driver D or not.

Other Embodiments

Although the present disclosure has been fully described in connection with preferred embodiment thereof with reference to the accompanying drawings, it is to be noted that various changes and modifications will become apparent to those skilled in the art.

For example, a positional condition of the subject vehicle CS for receiving the notification of an obstacle in a certain notification mode in the above embodiment may be changed and/or modified. That is, in the above embodiment, the notification is provided for the subject vehicle CS when the subject vehicle CS is located in the support service zone and is located in front of the crosswalk Z in the intersection. However, for example, the notification of the obstacle may be provided for the subject vehicle CS when the subject vehicle CS is located at a position that is not in front of the crosswalk Z.

Further, in the above embodiment, the condition for providing the obstacle notification in a certain notification mode includes a travel condition of the subject vehicle CS in addition to the position of the subject vehicle CS. However, the travel condition of the subject vehicle CS, such as a stopping condition, may be excluded from the condition for providing the obstacle notification in a certain notification mode. In other words, the subject vehicle CS may not have to be in the stopped condition to receive the notification in a certain notification mode.

Further, in the above embodiment, the subject vehicle CS receives the obstacle notification when turning right at an intersection. However, the subject vehicle CS may also receive the obstacle notification when turning left at an intersection. The determination of turning left may be performed in the same manner as the determination of turning right, such as based on the ON/OFF of the left turn signal.

Further, in the above embodiment, the road-view data captured by the roadside sensor 10 is transmitted from the roadside apparatus 20 to the in-vehicle apparatus 30, and the obstacle information is acquired based on the processing (i.e., analysis) of the acquired obstacle information by the in-vehicle apparatus 30. However, the road-view data detected by the roadside sensor 10 may be processed (i.e., analyzed) in the roadside apparatus 20, and the obstacle ID data according to such analysis in the roadside apparatus 20 is transmitted from the roadside apparatus 20 to the in-vehicle apparatus 30.

Further, the roadside sensor 10 is not limited to a camera. That is, the roadside sensor 10 may be implemented as a radar device.

Further, in the above embodiment, the first off-sight area A1 is generated by using information regarding a detected vehicle CO provided in the road-view data, which is received from the roadside apparatus 20, and the second off-sight area A2 is generated by using the neighboring vehicle information that is provided by the vehicle sensor 60, and the third off-sight area A3 is generated by using the other vehicle information received through the vehicle-to-vehicle communication from a vehicle CO. However, such configuration may be modified. That is, only one or two of the three types of other vehicle information described above may be used to generate the off-sight area.

Such changes, modifications, and summarized schemes are to be understood as being within the scope of the present disclosure as defined by appended claims.

What is claimed is:

1. An obstacle notification apparatus for notifying a driver of a subject vehicle of an obstacle on or around a crosswalk of an intersection, the subject vehicle either turning right or left at the intersection, the apparatus comprising: a notification unit configured to provide at least a sound as a notification to alert the driver of the obstacle; an obstacle information acquisition unit configured to acquire an obstacle information that includes a position of the obstacle relative to the crosswalk; a sight determination unit configured to define a non-visible area of the driver of the subject vehicle; a subject vehicle position calculation unit configured to calculate a position of the subject vehicle; a notification mode determination unit configured to determine a notification mode that is provided by the notification unit, the notification mode determination unit determines the notification mode based on the obstacle information acquired by the obstacle information acquisition unit and the non-visible area of the driver determined by the sight determination unit, when the position of the subject vehicle calculated by the subject vehicle position calculation unit is located at a position that is (a) outside of a road width of an intersection entering road, and that is (b) before the crosswalk; and another vehicle information acquisition unit configured to acquire information that includes information as to whether another vehicle is present in the intersection with the subject vehicle when at least a part of the other vehicle is within a predetermined distance from the subject vehicle, wherein the predetermined distance is equal to a distance that affects the sight of the driver of the subject vehicle if the another vehicle exists on a left side or a right side of the subject vehicle; the sight determination unit defines the non-visible area of the driver based on the information acquired by the other vehicle information acquisition unit, the notification mode determination unit determines whether the obstacle is positioned in at least one of a plurality of non-visible areas, and when the obstacle is determined to be positioned in at least one of the plurality of non-visible areas, the notification mode determination unit performs an intensive notification mode, and when the obstacle is determined to be positioned in none of the plurality of non-visible areas, the notification mode determination unit performs a moderate notification mode, wherein the intensive notification mode provokes a higher degree of attention from the driver than the moderate notification mode.

2. The obstacle notification apparatus of claim 1 further comprising: a travel condition detection unit configured to determine a travel condition of the subject vehicle, and wherein when the position of the subject vehicle calculated by the subject vehicle position calculation unit is located at a position that is (a) outside of a road width of the intersection entering road, and that is (b) before the crosswalk, and when a stop condition of the subject vehicle is detected by the travel condition detection unit, the notification mode determination unit determines the notification mode of the notification unit.

3. The obstacle notification apparatus of claim 1, wherein the notification mode determination unit is further configured to set the notification mode to a higher degree notification for an obstacle that is out of sight of the driver than for an obstacle that is in sight of an obstacle.

4. The obstacle notification apparatus of claim 2, wherein the notification mode determination unit is further configured to set the notification mode to a higher degree notification, when the subject vehicle is determined to be moving by the travel condition detection unit than when the subject vehicle is detected to in a stopping condition.

5. The obstacle notification apparatus of claim 1, wherein when the other vehicle exists on a left side next to the subject vehicle, the sight determination unit is further configured to determine the non-visible area as an area that includes one of a part and all of the left side of the subject vehicle.

6. The obstacle notification apparatus of claim 1, wherein when the other vehicle exists on a right side next to the subject vehicle, the sight determination unit is further configured to determine the non-visible area as an area that includes one of a part and all of the right side of the subject vehicle.

7. The obstacle notification apparatus of claim 1 further comprising:

a memory unit configured to store a vehicle height of the subject vehicle, and the sight determination unit is further configured to determine a frontward sight of the driver on a front side of the subject vehicle based on the vehicle height information stored in the memory unit.

8. The obstacle notification apparatus of claim 1, wherein the obstacle information acquisition unit acquires the obstacle information including a height of the obstacle, and the notification mode determination unit is further configured to determine a notification mode that is to be provided by the notification unit based on the height of the obstacle and the non-visible area of the driver determined by the sight determination unit.

* * * * *